United States Patent [19]
Fukasawa et al.

[11] Patent Number: 5,474,158
[45] Date of Patent: Dec. 12, 1995

[54] BRAKE BAND

[75] Inventors: Toshihide Fukasawa; Yasunari Mochizuki; Mitsugi Tazawa, all of Fuji, Japan

[73] Assignee: Jatco Corporation, Fuji, Japan

[21] Appl. No.: 228,253

[22] Filed: Apr. 15, 1994

[30] Foreign Application Priority Data

Apr. 16, 1993 [JP] Japan .................... 5-113868
Apr. 26, 1993 [JP] Japan .................... 5-123562

[51] Int. Cl.$^6$ .................................... F16D 65/06
[52] U.S. Cl. .................... 188/77 R; 188/77 W; 188/259
[58] Field of Search .................... 188/77 R, 77 W, 188/249, 259, 264 B, 264 E; 192/107 T, 113.31, 113.34, 113.35

[56] References Cited

U.S. PATENT DOCUMENTS

| | | | |
|---|---|---|---|
| 4,159,049 | 6/1979 | Merz | 188/259 X |
| 4,787,483 | 11/1988 | Stefanutti | 188/77 R X |
| 5,135,082 | 8/1992 | Umezawa et al. | 188/77 R X |
| 5,238,091 | 8/1993 | Nakagawa et al. | 188/77 W |

FOREIGN PATENT DOCUMENTS

| | | |
|---|---|---|
| 2-103534 | 8/1990 | Japan . |
| 3260424 | 11/1991 | Japan .................. 188/77 R |
| 4277332 | 10/1992 | Japan .................. 188/77 W |
| 5106664 | 4/1993 | Japan .................. 188/77 R |

*Primary Examiner*—Robert Oberleitner
*Assistant Examiner*—Kevin D. Rutherford
*Attorney, Agent, or Firm*—Foley & Lardner

[57] ABSTRACT

A brake system comprising a brake drum having an outer peripheral surface, and a brake band including a flexible band-shaped metal member having fixed and actuation brackets mounted near the opposite ends thereof. The band-shaped metal member is wound around the outer peripheral surface of the brake drum with the fixed bracket being fixed to an anchorage pin. The brake band also includes a lining member fixed on the band-shaped metal member. An actuator is coupled to the actuation bracket for acting a force on the band-shaped metal member to bring the lining member into surface contact with the outer peripheral surface of the brake drum at a speed. Oil grooves are formed in the lining member for discharging oil from a space between the lining member and the brake drum to control the speed at which the lining member comes into surface contact with the brake drum. The oil grooves have an oil discharging capacity increasing as going from the fixed bracket toward the actuation bracket.

4 Claims, 5 Drawing Sheets

5,474,158

BRAKE BAND

BACKGROUND OF THE INVENTION

This invention relates to a brake band for use with a band brake system.

For example, Japanese Utility Model Kokai No. 2-103534 discloses a brake band having a lining member fixed thereon. The brake band is fixed at its one end through a fixed bracket to an anchorage pin and coupled at the other end thereof through an actuation bracket to an actuator. In order to stop the rotation of the brake drum, the actuator may be operated to act a force on the brake band so as to bring the lining member into surface contact with the brake drum. The lining member is formed to have oil grooves for discharging oil from the space between the lining member and the brake drum so as to provide a greater oil discharging capacity under a leading condition.

However, the conventional brake band has demonstrated very poor durability. The reason for this is that the oil grooves reduces the area for surface contact of the lining member with the brake drum to increase the surface pressure of the lining member particularly in the section corresponding to the position where the actuation bracket is mounted on the brake band. Furthermore, this section of the lining member has a great rigidity and it is subjective to wear because of an increased surface pressure.

SUMMARY OF THE INVENTION

It is a main object of the invention to provide an improved brake band which exhibits good durability.

There is provided, in accordance with the invention, a brake system comprising a brake drum having an outer peripheral surface, and a brake band including a flexible band-shaped metal member having fixed and actuation brackets mounted near the opposite ends thereof. The band-shaped metal member is wound around the outer peripheral surface of the brake drum with the fixed bracket being fixed to an anchorage pin. The brake band also includes a lining member fixed on the band-shaped metal member. An actuator is coupled to the actuation bracket for acting a force on the band-shaped metal member to bring the lining member into surface contact with the outer peripheral surface of the brake drum at a speed. Oil discharging means is formed in the lining member for discharging oil from a space between the lining member and the brake drum to control the speed at which the lining member comes into surface con tact with the brake drum. The oil discharging means has an oil discharging capacity increasing as going from the fixed bracket toward the actuation bracket.

In another aspect of the invention, there is provided a brake system comprising a brake drum having an outer peripheral surface, and a brake band including a flexible band-shaped metal member having fixed and actuation brackets mounted near the opposite ends thereof. The band-shaped metal member is wound around the outer peripheral surface of the brake drum with the fixed bracket being fixed to an anchorage pin. The brake band also includes a lining member fixed on the band-shaped metal member. The lining member has a first end section corresponding to a position where the fixed bracket is mounted to the band-shaped metal member, a second end section corresponding to a position where the actuation bracket is mounted to the band-shaped metal member, and first and second intermediate sections defined between the first and second end sections. The first intermediate section is defined between the first end section and the second intermediate section. The second intermediate section is defined between the first intermediate section and the second end section. An actuator is coupled to the actuation bracket for acting a force on the band-shaped metal member to bring the lining member into surface contact with the outer peripheral surface of the brake drum at a speed. Oil discharging means is formed in the lining member for discharging oil from a space between the lining member and the brake drum to control the speed at which the lining member comes into surface contact with the brake drum. The oil discharging means has an oil discharging capacity smaller in the first and second end sections than in the first and second intermediate sections. The oil discharging means has an oil discharging capacity which is greater in the first intermediate section than in the second intermediate section under a trailing condition and is smaller in the first intermediate section than in the second intermediate section under a leading condition.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
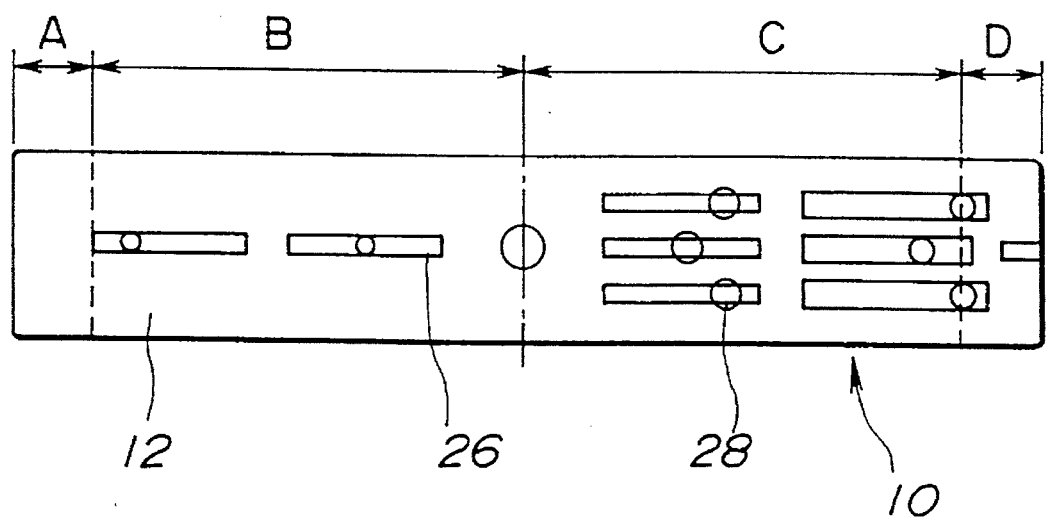
FIG. 1 is a plan view showing one embodiment of a brake band made in accordance with the invention.
Figure 2:
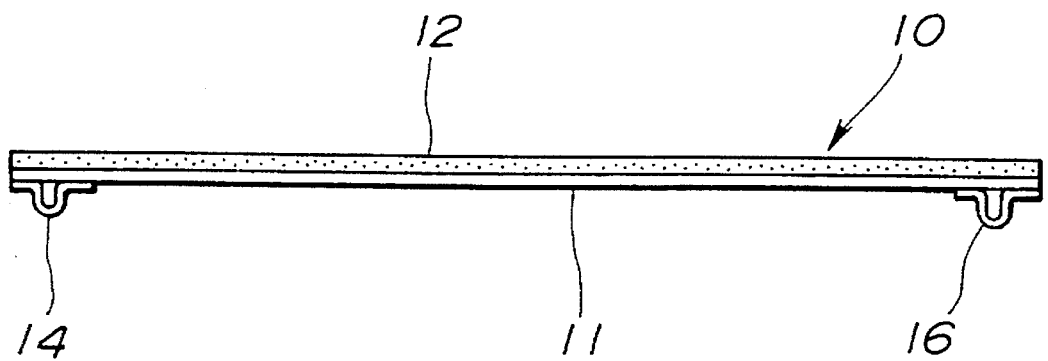
FIG. 2 is a side view of the brake band of FIG. 1.
Figure 3:
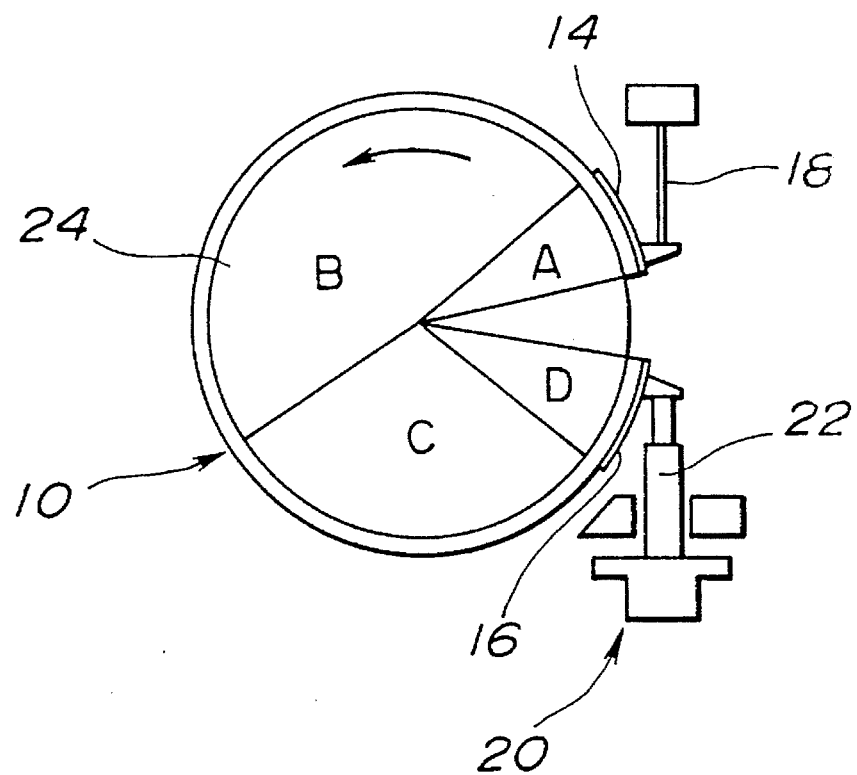
FIG. 3 is a schematic view showing a brake system employing the brake band of FIG. 1.

With reference to the drawings, and in particular to FIGS. 1, 2 and 3, there is shown a brake band embodying the invention. The brake band, generally designated by the numeral 10, includes a flexible band-shaped metal member 11, and a lining member 12 fixed over the front surface of the band-shaped metal member 11. The band-shaped metal member 11 has fixed and actuation brackets 14 and 16 welded to the rear surface thereof near its opposite ends. The brake band 10 is assembled in a brake system including a brake drum 24 around which the brake band 10 is wound with the fixed bracket 14 being fixed to an anchorage pin 18 and the actuation bracket 16 being coupled to the piston 22 of a hydraulic servo unit 20, as shown in FIG. 3. In FIG. 3, the arrow indicates the direction of rotation of the brake drum 24.

Returning to FIG. 1, the lining member 12 is formed in its front surface with a number of oil grooves 26 extending in the direction of length of the brake band 10. The lining member 12 has a first end section A corresponding to the position where the fixed bracket 14 is mounted to the band-shaped metal member 11, a second end section D corresponding to the position where the actuation bracket 16 is mounted to the band-shaped metal member 11, and first and second intermediate sections B and C. The first intermediate section B is positioned between the first end section A and the second intermediate section C. The second intermediate section C is positioned between the first intermediate section B and the second end section D. In the illustrated case, the first end section A is formed to have no oil groove 26 formed therein, the first intermediate section B is formed to have a line of oil grooves 26, the second intermediate section C is formed to have three lines of oil grooves 26, and the second end section D is formed to have a single oil groove 26. The oil grooves 26 are formed to have an area per unit brake-band circumferential length increasing as going from the section A toward the section D. For this purpose, the oil grooves 26 formed in the second intermediate section C near the second end section D have a width greater than the oil grooves 26 formed in the second intermediate section C near the first intermediate section B. Furthermore, the single oil groove 26 formed in the second end section D of the lining member 12 has such a narrow width as to provide an area per unit brake-band circumferential length smaller than the oil grooves 26 formed in the second intermediate section C. Each of the oil grooves 26 has an oil hole 28 extending through the band-shaped metal member 11 and the lining member 12 for discharging oil from the corresponding one of the oil grooves 26 to the exterior of the brake band 10.

The operation of the brake band 10 is as follows: To stop the rotation of the brake drum 24, the hydraulic servo unit 20 may be operated to act a pushing force on the actuation bracket 16 so as to bring the brake band 10 into engagement with the brake drum 24. During this operation, the first end section A first comes into surface contact with the brake drum 24. That is, the lining member 12 comes into surface contact with the brake drum 24 in a sequence or order of the sections A, B, C and D. The first intermediate section B is formed to have a greater oil discharging capacity, that is, a greater oil groove area per unit brake-band circumferential length than the first end section A, whereas the second intermediate section C is formed to have a greater oil discharging capacity, that is, a greater oil groove area per unit brake-band circumferential length than the first intermediate section B. As a result, the oil is discharged from the space between the lining member 12 and the brake drum 24 at a greater speed as going from the section A toward the section D. That is, the speed at which the brake band 10 comes into surface contact with the brake drum 24 increases as going from the section A toward the section D. For this reason, a great torque capacity is obtained also in the early stage of engagement of the brake. It is, therefore, possible to provide a flat torque characteristic over the whole period of engagement of the brake.

Since the second end section D corresponds to the position where the actuation bracket 16 is welded to the band-shaped metal member 11, it has such a great rigidity as to increase the surface pressure of the lining member 12. In this embodiment, the second end section D is formed to have a smaller oil groove area per unit brake-band circumferential length and, thus, a greater lining member effective area than the second intermediate section C. As a result, the surface pressure cannot increase over a predetermined level. This is effective to protect the second end section D from excessive wear.

Figure 4:
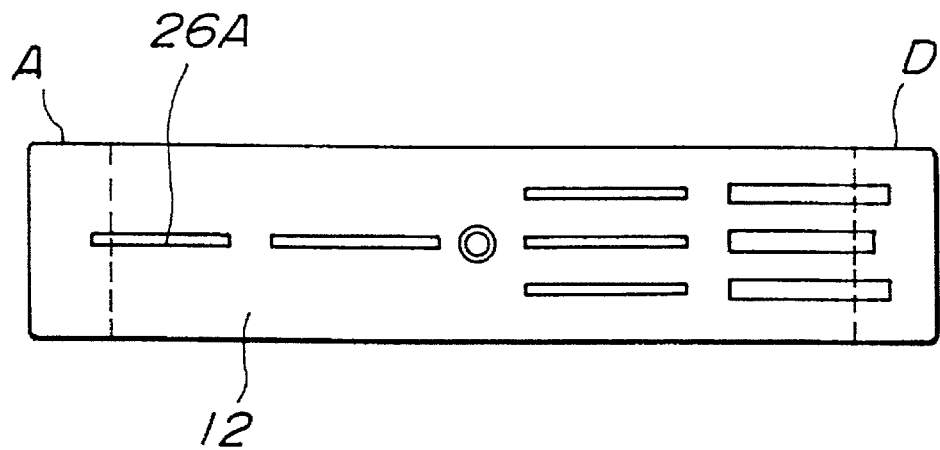
FIG. 4 is a plan view showing a modified form of the brake band of FIG. 1.

Referring to FIG. 4, there is shown a first modification of the first embodiment of the invention. In this embodiment, one of the oil grooves 26A formed in the first intermediate section B somewhat extends into the first end section A.

Figure 5:
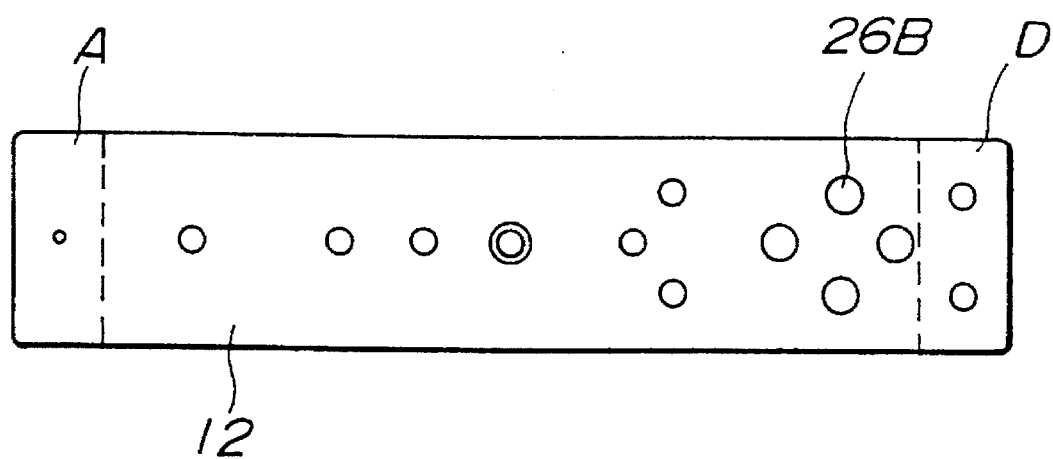
FIG. 5 is a plan view showing another modified form of the brake band of FIG. 1.

Referring to FIG. 5, the lining member 12 is formed with a number of oil holes 26B in such a manner as to have an oil discharging area, that is, an oil discharging capacity, increasing as going from the section A toward the section D. In this modification, the second end section D is formed to have two oil holes to provide a greater lining member effective area than the second intermediate section C. A small hole is formed in the first end section A.

Figure 6:
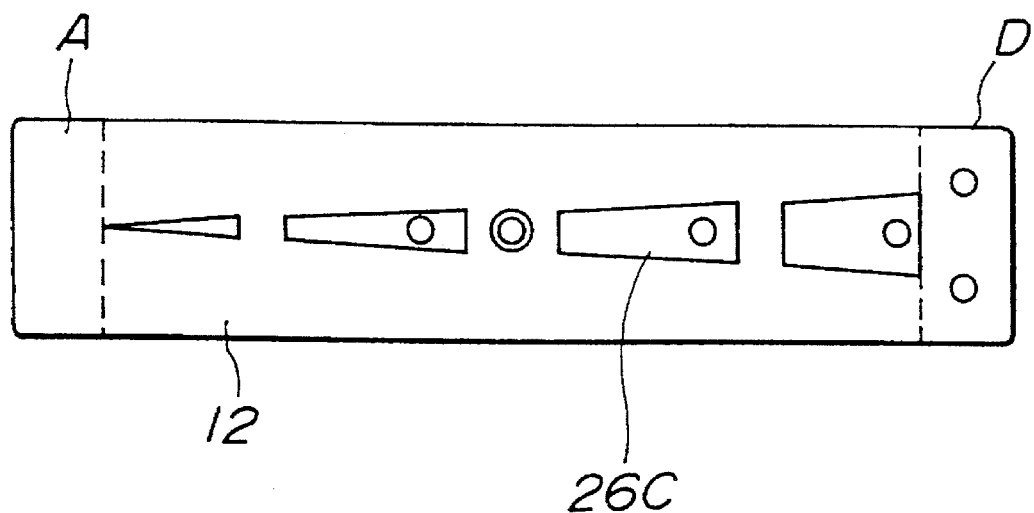
FIG. 6 is a plan view showing still another modified form of the brake band of FIG. 1.

Referring to FIG. 6, the lining member 12 is formed with a line of tapered oil grooves 26C in such a manner as to increase the oil discharging capacity, that is, the oil groove area per unit brake-band circumferential length as going from the section A toward the section D. In this modification, the second end section D is formed to have two oil holes to provide a greater lining member effective area than the second intermediate section C.

Figure 7:
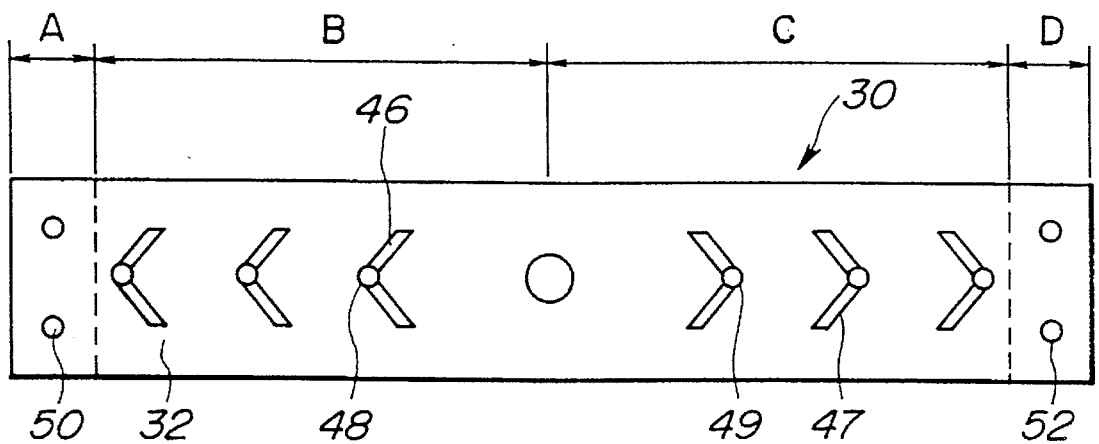
FIG. 7 is a plan view showing a second embodiment of the brake band of the invention.
Figure 8:
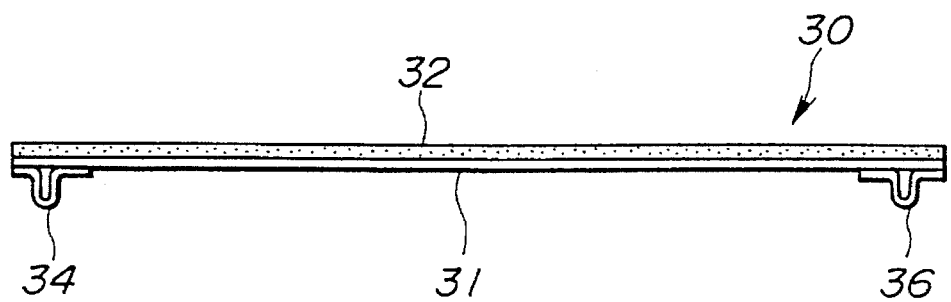
FIG. 8 is a side view of the brake band of FIG. 7.
Figure 9:
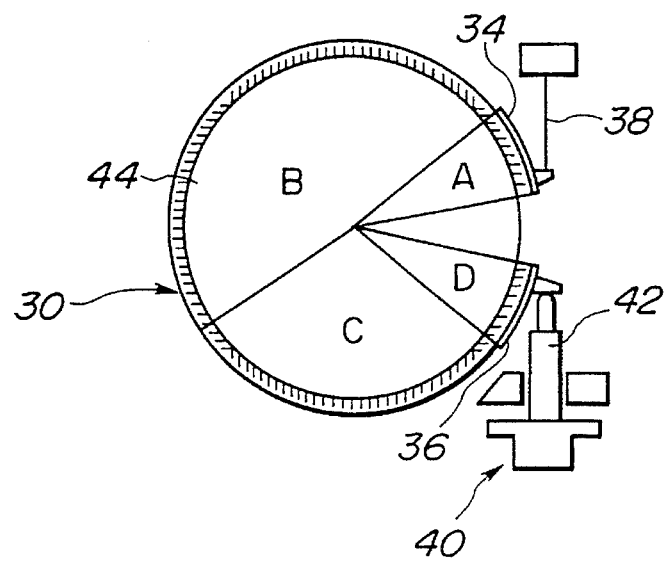
FIG. 9 is a schematic view showing a brake system employing the brake band of FIG. 7.

Referring to FIGS. 7, 8 and 9, there is shown a second embodiment of the brake band made in accordance with the invention. In this embodiment, the brake band, generally designated by the numeral 30, includes a flexible band-shaped metal member 31, and a lining member 32 fixed over the front surface of band-shaped metal member 31. The band-shaped metal member 31 has fixed and actuation brackets 34 and 36 welded to the rear surface thereof near its opposite ends. The brake band 30 is assembled in a brake system including a brake drum 44 around which the brake band 30 is wound with the fixed bracket 34 fixed to an anchorage pin 38 and the actuation bracket 36 coupled to the piston 42 of a hydraulic servo unit 40, as shown in FIG. 9. Thus, the band-shaped metal member 31 may be formed previously in a circular shape.

Return to FIG. 7, the lining member 32 is formed in its front surface with a number of V-shaped oil grooves 46 and 47 directed in reversed directions. The lining member 32 has a first end section A corresponding to the position where the fixed bracket 34 is mounted to the band-shaped metal member 31, a second end section D corresponding to the position where the actuation bracket 36 is mounted to the band-shaped metal member 31, and first and second intermediate sections B and C. The first intermediate section B is positioned between the first end section A and the second intermediate section C. The second intermediate section C is positioned between the first intermediate section B and the second end section D. In the illustrated case, the first end section A is formed to have two oil holes 50 spaced in the direction of width of the lining member 32, the first intermediate section B is formed to have three V-shaped oil grooves 46 equally spaced in the direction of length of the lining member 32 and having apexes or turning points directed toward the first end section A, the second intermediate section C is formed to have three V-shaped oil grooves 47 equally spaced in the direction of length of the lining member 32 and having apexes or turning points directed toward the second end section D, and the second end section D is formed to have two oil holes 52 spaced in the direction of width of the lining member 32. That is, the oil grooves 47 formed in the second intermediate section C are directed in the direction opposite to the direction in which the oil grooves 46 formed in the first intermediate section B are directed. A through-hole 48 is formed at the apex or turning point of the corresponding one of the oil grooves 46 and it extends through the band-shaped metal member 31 and the lining member 32 for discharging oil from the corresponding oil groove 46 to the exterior of the brake band 30. Similarly, a through-hole 49 is formed at the apex or turning point of the corresponding one of the oil grooves 47 and it extends through the band-shaped metal member 31 and the lining member 32 for discharging oil from the corresponding oil groove 47 to the exterior of the brake band 30.

The operation of the brake band 30 is as follows: To stop the rotation of the brake drum 44, the hydraulic servo unit 40 may be operated to act a pushing force on the actuation bracket 36 so as to bring the brake band 30 into engagement with the brake drum 44. Under a leading condition, the first end section A first comes in to surface contact with the brake drum 44. That is, the lining member 32 comes into surface contact with the brake drum 44 in a sequence or order of the sections A, B, C and D. Since the first end section A has only two oil holes 50, the first intermediate section B has oil grooves 46 having apexes directed in the direction opposite to the direction in which the lining member 32 comes into surface contact with the brake drum 44, and the second intermediate section C has oil grooves 47 having apexes directed in the same direction as the direction in which the lining member 32 comes in to surface contact with the brake drum 44, the oil is discharged from the space between the lining member 32 and the brake drum 44 with a greater efficiency or at a greater rate and, thus, the brake band 30 comes into surface contact with the brake drum 44 at a higher speed as going toward the section D. For this reason, a great torque capacity is obtained also in the early stage of engagement of the brake. It is, therefore, possible to provide a flat torque characteristic over the whole period of engagement of the brake.

Since the second end section D corresponds to the position where the actuation bracket 36 is welded to the band-shaped metal member 31, it has such a great rigidity as to increase the surface pressure of the lining member 32. In this embodiment, the second end section D is formed to have a smaller oil discharge area and, thus, a greater lining member effective area than the second intermediate section C. As a result, the surface pressure cannot increase over a predetermined level. This is effective to protect the second end section D from excessive wear.

Under a trailing condition, the second end section D first comes into surface contact with the brake drum 44. That is, the lining member 32 comes into surface contact with the brake drum 44 in a sequence or order of the sections D, C, B and A. Since the second end section D has only two oil holes 52, the second intermediate section C has oil grooves 47 having apexes directed in the opposite direction as the direction in which the lining member 32 comes into surface contact with the brake drum 44, and the first intermediate section B has oil grooves 46 having apexes directed in the same direction in which the lining member 32 comes into surface contact with the brake drum 44, the oil is discharged from the space between the lining member 32 and the brake drum 44 with a greater efficiency or at a greater rate and, thus, the brake band 30 comes into surface contact with the brake drum 44 at a higher speed as going toward the section A. For this reason, a great torque capacity is obtained also in the early stage of engagement of the brake. It is, therefore, possible to provide a flat torque characteristic over the whole period of engagement of the brake.

Since the first end section A corresponds to the position where the fixed bracket 34 is welded to the band-shaped metal member 31, it has such a great rigidity as to increase the surface pressure of the lining member 32. In this embodiment, the first end section A is formed to have a smaller oil discharge area and, thus, a greater lining member effective area than the first intermediate section B. As a result, the surface pressure cannot increase over a predetermined level. This is effective to protect the first end section A from excessive wear.

Figure 10:
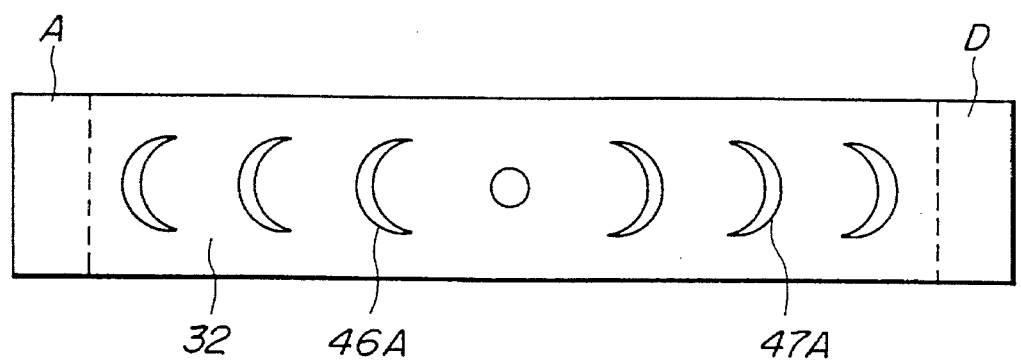
FIG. 10 is a plan view showing a modified form of the brake band of FIG. 7.

Referring to FIG. 10, there is shown a first modification of the second embodiment of the invention. In this embodiment, the first intermediate section B is formed to have three crescent-shaped oil grooves 46A equally spaced in the direction of length of the lining member 32 and directed in a first direction and the second intermediate section C is formed to have three crescent-shaped oil grooves 47A equally spaced in the direction of length of the lining member 32 and directed in a second direction opposite to the first direction. The oil discharging capacity is greater in the first intermediate section B than in the second intermediate section C under a trailing condition and is smaller in the first intermediate section than in the second intermediate section under a leading condition.

Figure 11:
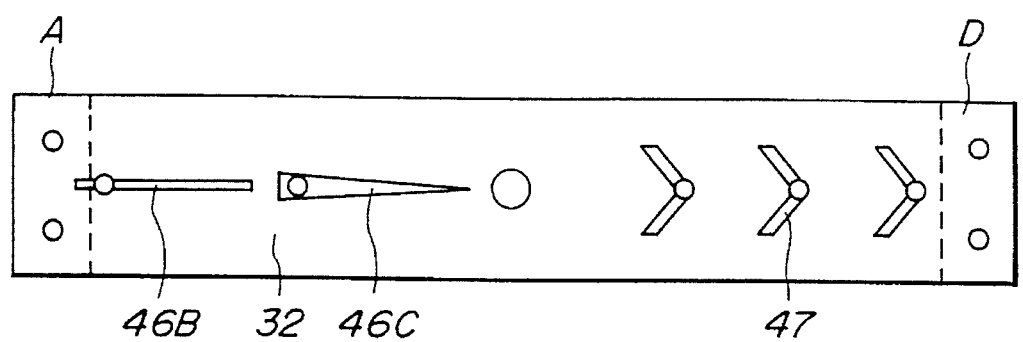
FIG. 11 is a plan view showing another modified form of the brake band of FIG. 7.

Referring to FIG. 11, there is shown a second modification of the second embodiment of the invention. In this embodiment, the first intermediate section B is formed to have a rectangular oil groove 46B and a rectangular oil groove 46C arranged in a line and the second intermediate section C is formed to have three V-shaped oil grooves 47 equally spaced in the direction of length of the lining member 32. The oil discharging capacity is greater in the first intermediate section B than in the second intermediate section C under a trailing condition and is smaller in the first intermediate section than in the second intermediate section under a leading condition.

What is claimed is:

1. A brake system comprising:

a brake drum having an outer peripheral surface;

a brake band including a flexible band-shaped metal member having fixed and actuation brackets mounted near the opposite ends thereof, the band-shaped metal member being wound around the outer peripheral surface of the brake drum with the fixed bracket being fixed to an anchorage pin, and a lining member fixed on the band-shaped metal member, the lining member having a first end section corresponding to a position where the fixed bracket is mounted to the band-shaped metal member, a second end section corresponding to a position where the actuation bracket is mounted to the band-shaped metal member, and an intermediate section defined between the first and second end sections;

an actuator coupled to the actuation bracket for acting a force on the band-shaped metal member to bring the lining member into surface contact with the outer peripheral surface of the brake drum at a speed; and oil discharging means formed only in the intermediate section in the lining member, for discharging oil from a space between the lining member and the brake drum to control the speed at which the lining member comes into surface contact with the brake drum, the oil discharging means having an oil discharging capacity increasing as going from the fixed bracket toward the actuation bracket.

2. The brake system as claimed in claim 1, wherein the oil discharging means includes oil grooves formed in the lining member, the oil grooves having an area per unit band-brake circumferential length increasing as going from the fixed bracket toward the actuation bracket.

3. A brake system comprising:

a brake drum having an outer peripheral surface;

a brake band including a flexible band-shaped metal member having fixed and actuation brackets mounted near the opposite ends thereof, the band-shaped metal member being wound around the outer peripheral surface of the brake drum with the fixed bracket being fixed to an anchorage pin, and a lining member fixed on the band-shaped metal member;

an actuator coupled to the actuation bracket for acting a force on the band-shaped metal member to bring the lining member into surface contact with the outer peripheral surface of the brake drum at a speed; and oil discharging means formed in the lining member for discharging oil from a space between the lining member and the brake drum to control the speed at which the lining member comes into surface contact with the brake drum, the oil discharging means having an oil discharging capacity increasing as going from the fixed bracket toward the actuation bracket;

wherein the lining member has a first end section corresponding to a position where the fixed bracket is mounted to the band-shaped metal member, a second end section corresponding to a position where the actuation bracket is mounted to the band-shaped metal member, and an intermediate section defined between the first and second end sections, and wherein the area per unit band-brake circumferential length of oil grooves is smaller in the second end section than in the intermediate section.

4. A brake system comprising:

a brake drum having an outer peripheral surface;

a brake band including a flexible band-shaped metal member having fixed and actuation brackets mounted near the opposite ends thereof, the band-shaped metal member being wound around the outer peripheral surface of the brake drum with the fixed bracket being fixed to an anchorage pin, and a lining member fixed on the band-shaped metal member, the lining member having a first end section corresponding to a position where the fixed bracket is mounted to the band-shaped metal member, a second end section corresponding to a position where the actuation bracket is mounted to the band-shaped metal member, and first and second intermediate sections defined between the first and second end sections, the first intermediate section being defined between the first end section and the second intermediate section, the second intermediate section being defined between the first intermediate section and the second end section;

an actuator coupled to the actuation bracket for acting a force on the band-shaped metal member to bring the lining member into surface contact with the outer peripheral surface of the brake drum at a speed; and oil discharging means formed in the lining member for discharging oil from a space between the lining member and the brake drum to control the speed at which the lining member comes into surface contact with the brake drum, the oil discharging means having an oil discharging capacity smaller in the first and second end sections than in the first and second intermediate sections, the oil discharging means having an oil discharging capacity which is greater in the first intermediate section than in the second intermediate section under a trailing condition and is smaller in the first intermediate section than in the second intermediate section under a leading condition.

* * * * *